Jan. 30, 1962  J. B. ANDERSON  3,018,717
APPARATUS FOR SEPARATING FRUIT PULP FROM SKINS
Filed March 6, 1958  3 Sheets-Sheet 1

INVENTOR.
JAMES B. ANDERSON.
BY
ATTORNEYS.

Jan. 30, 1962 J. B. ANDERSON 3,018,717
APPARATUS FOR SEPARATING FRUIT PULP FROM SKINS
Filed March 6, 1958 3 Sheets-Sheet 3
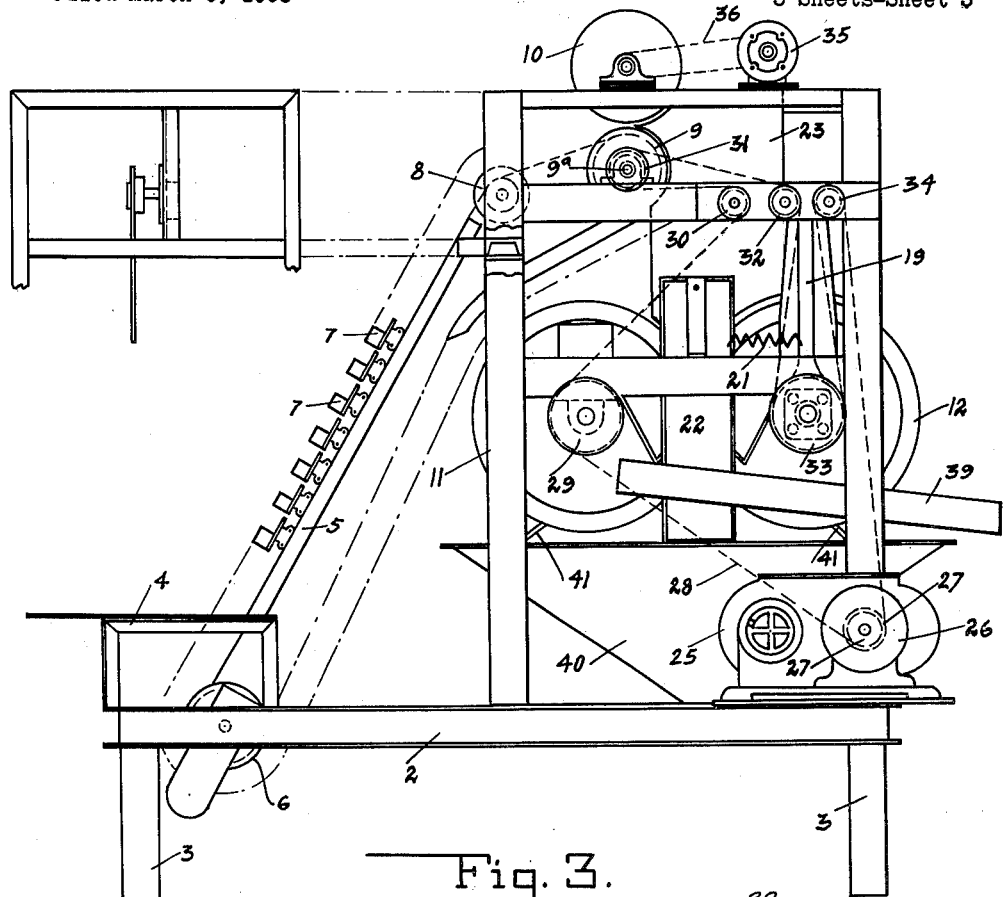
Fig. 3.
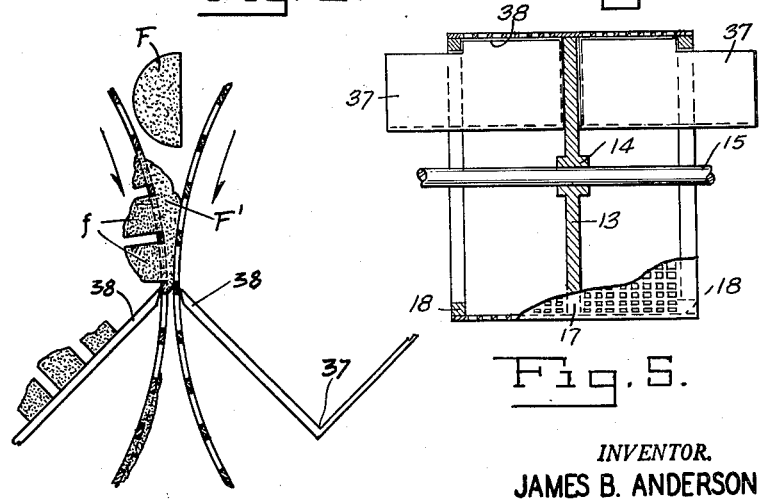
Fig. 4.
Fig. 5.
INVENTOR.
JAMES B. ANDERSON.
BY
ATTORNEYS.

United States Patent Office 3,018,717
Patented Jan. 30, 1962

3,018,717
APPARATUS FOR SEPARATING FRUIT
PULP FROM SKINS
James B. Anderson, Mount Lebanon Township, Allegheny County, Pa., assignor to H. J. Heinz Company, Pittsburgh, Pa., a corporation of Pennsylvania
Filed Mar. 6, 1958, Ser. No. 719,567
10 Claims. (Cl. 100—97)

This invention is for a machine for processing tomatoes or like fruits or vegetables to separate the pulp from the skin, and is for a machine which will automatically and effectively accomplish this purpose.

While my invention is applicable to the processing of various fruits or vegetables, it has been particularly designed for processing tomatoes and will be particularly described in this connection without, however, excluding other fruits or vegetables.

In the making of a product such as chili-sauce from tomatoes, it is desirable to separate the tomato pulp from the skins, and the pulp should be lumpy, with chunks of the flesh of the tomato. My machine is designed to produce a pulp suitable for this purpose.

Also, in the processing of tomatoes for commercial use in making tomato paste, ketchup or the like, the tomatoes are sorted over and all those having blemish or decay are removed. If the defect is only on the surface, the tomato may be used. If the condition extends into the pulp, the tomato must be discarded. Those with skin blemishes or superficial defects are ordinarily trimmed by hand and then used. The present machine is designed to accept fruit with such superficial blemish and remove the pulp and produce a product more free of objectionable material than is secured with hand processing, or more technically expressed, my machine significantly reduces mold count in the tomato flesh.

My invention is based on the use of a pair of oppositely rotating cylindrical drums with perforated or screen-like peripheries. The fruit is elevated to a severing device which cuts each fruit into halves, and the halves fall between the drums with the cut surface toward one or the other of the screen-like surfaces of the drums. Passing between the screens, the flesh of the fruit is forced through the mesh of one screen while the skin is restrained from passing through the screen. A knife within each drum severs the pulp as it is carried by rotation of the screen past the knife and the flesh falls into a receiver from whence it is carried out one end of the drum.

The machine may be more fully understood by reference to the accompanying drawings, in which:

FIG. 3 is a side elevation of the machine on a smaller scale;

FIG. 4 is a schematic view of the nature of a fragmentary sectional section in the plane of line IV—IV of FIG. 1, and FIG. 5 is a horizontal section through one of the drums, a fragment of the drum, however, being shown in elevation.

Figure 1:
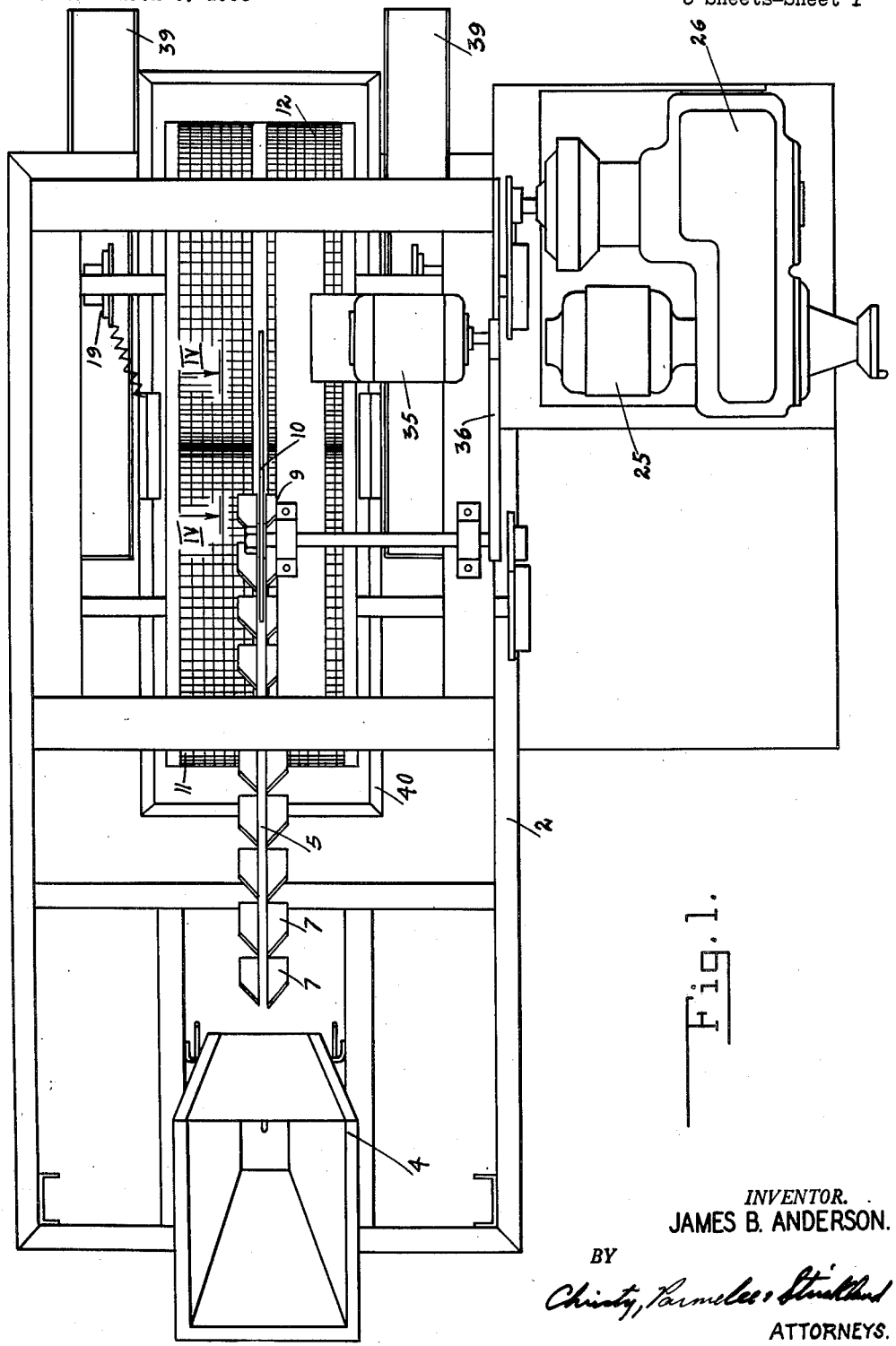
FIG. 1 is a plan view of a machine incorporating my invention.
Figure 2:
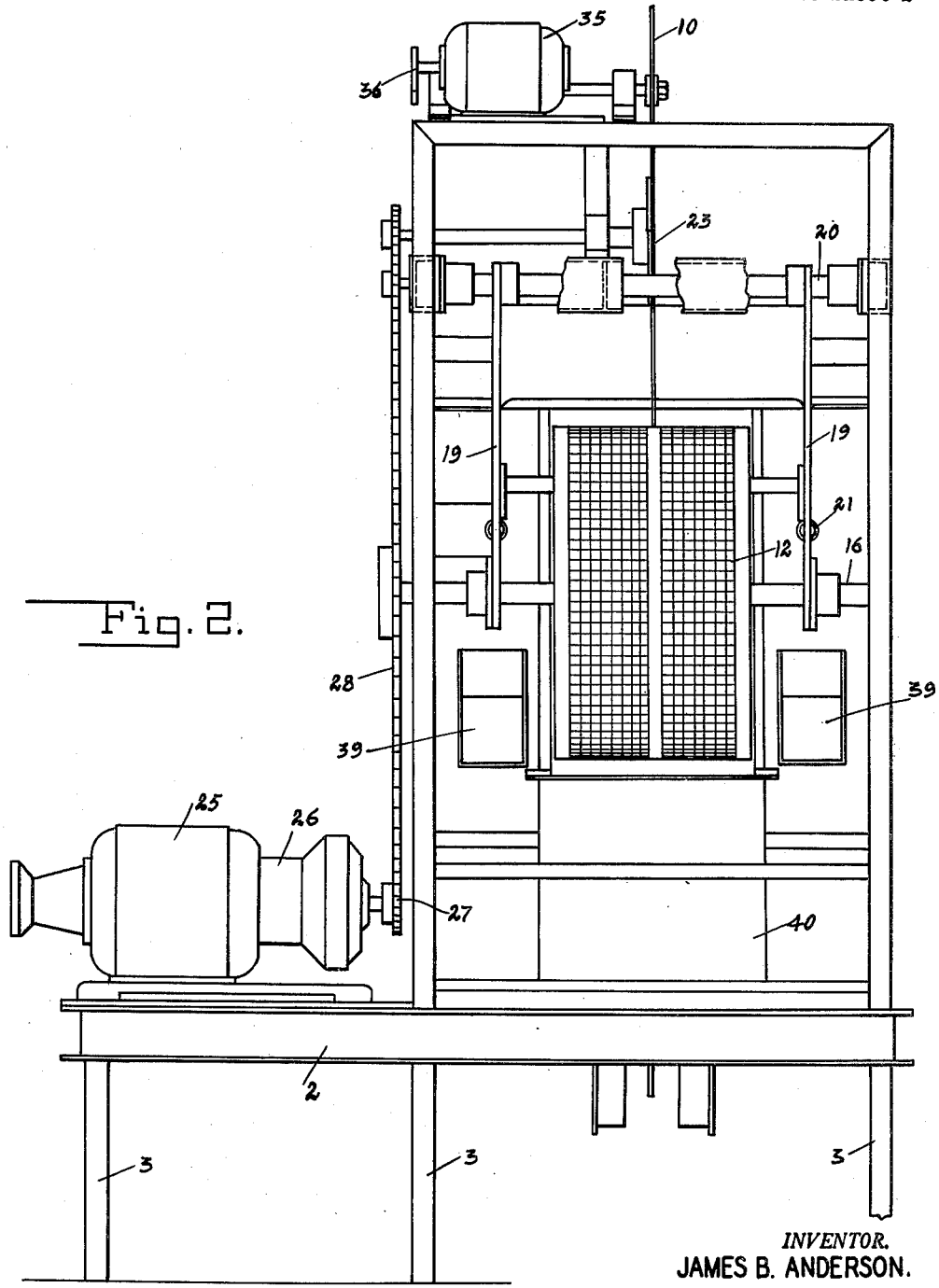
FIG. 2 is an end elevation viewed toward the left from FIG. 1.

In the drawing, 2 designates a generally rectangular supporting frame on upright structural legs 3. A fruit-receiving hopper 4 is supported at one end of this frame. There is a conveyor chain 5 that passes around a sprocket 6 below this hopper, and the conveyor has a succession of split carriers or flights 7 thereon which are moved up through the hopper, each flight being large enough to retain only a single tomato.

The supporting frame has upright supports extending well above the hopper, and the conveyor chain 5 passes over a guide roller 8 and then around a sprocket 9. A rotating disk knife 10 is supported centrally above the conveyor so that as each carrier in turn moves beneath the knife, the fruit within it is cut in two, the split form of the carrier 7 providing clearance for the knife. Then as the conveyor chain rounds the upper sprocket 9 the two halves of the tomato fall clear of the carrier.

Below the carrier are two rolls or drums 11 and 12, the surfaces of the drums being formed of thin flat sheet metal bent into cylindrical form with openings punched therein, the openings preferably being square and separated from each other by narrow strips of the original metal so as to form a coarse screen. On the interior of the drum at the middle thereof is a supporting disk 13 having a hub 14 through which passes a shaft for rotating the drum, the shaft for the drum 11 being designated 15 and the shaft for the drum 12 being designated 16. The outer rim of this disk is welded to the interior of the perforated plate or screen, and the screen has a smooth band 17 around the middle where there are no holes or openings. The drum is made rigid by having a hoop or annulus 18 welded into each end thereof. The shaft 15 for the drum 11 is relatively fixed in the frame, while the shaft 16 for the drum 12 is carried to the lower ends of the links 19 pivotally hung from a cross rod 20. This allows drum 12 to move toward and away from the drum 11. Tension springs 21 attached to the links and to splash plates 22 fixed in the machine frame yieldably urge the roll 12 against the roll 11.

The drums are so located with respect to the cutting knife 10 that the center disk 13 of the drums is in the same vertical plane as the cutting knife, and there is a fixed partition or divider 23 that extends downwardly from the plane of the knife to the peripheries of the drums. Because of this divider plate, the two halves of the fruit, after they have been severed, and when they fall toward the drums, fall to opposite sides of the divider plate so that they cannot interfere with one another, but must be squeezed separately and out of contact with each other.

The drums rotate in opposite directions with the confronting top quadrants moving toward each other to a point of contact or proximate point of contact on their line of centers. For the purpose of driving the drums there is provided a motor 25 operating through a speed reducing gear 26 to drive a sprocket 27. A chain 28 passes around this sprocket, around a sprocket 29 at the end of the shaft 15 over an idler 30, around sprocket 31 on the shaft 9a which supports the conveyor chain sprocket 9. The chain 28 then passes over an idler 32 and around a sprocket 33 on the end of the shaft 16 which carries the drum 12, then over an idler 34 and returns to the drive sprocket 27. The chain 28 thus drives the two drums in opposite directions, and also drives the conveyor 5. Since the conveyor and drum are driven from a common source of power, it is easy to co-relate their speeds so that each piece of fruit is separately squeezed, and there is no accumulation of interfering pieces in the bight of the rolls. The cutting knife 10 is preferably separately driven by a motor 35 on the top of the frame, which drives the knife through a belt 36.

Projecting into each end of the drums 11 and 12 is a trough 37, and one side of this trough terminates in a knife edge 38 that bears against the interior of the peripheral screen of the drum. The outer ends of these troughs extend over other troughs 39 at each side of the machine frame. The knife edges 38 are located just at or just below the line of contact between the peripheries of the two drums, and they function to cut the flesh of the fruit which is pressed through the openings in the screens, freeing it from the skins which cannot pass through the screens. The flesh or pulp so removed slides down the sloping side of the knife blade into the trough-like support and flows out of the end of the trough 37 into the trough 39.

There is a removable receptacle or hopper 40 below the two drums into which the skins of the fruit fall after they have passed through the bight of the rolls. In FIG. 3 I have shown scraper blades at 41 which may be provided to bear against the outer surfaces of the rolls at the bottom and remove any skins that attempt to adhere to the respective drums.

In the operation of the machine, the fruit is elevated in the manner described, cut in two, and the two parts fall on opposite sides of the divider plate 23. The shape of the fruit is such that one of the severed faces will contact the screen forming one surface of a drum, and as the fruit is carried into the bight of the rolls the flesh is pressed through the screen, while the pieces of skin which are too large to pass through the mesh of the screen, are restrained on the outside. The knife severs the flesh which is pushed through the screen into chunks which are collected and removed in the manner described.

The resilient mounting for the drum 12 allows it to spring away from the drum 11 if a hard object happens to fall between the rolls, or if a tomato, with a hard lump, or which is not sufficiently ripened, falls between the screens.

The operation may be clearly visualized from FIG. 4 in which F designates a half of a tomato or other fruit falling toward the two rolls 11 and 12, while $F^1$ indicates another half which is being squeezed, while the flesh $f$ is about to be severed by the knife edge 38.

While some of the flesh of course is squeezed and the juice is expelled from it, a large percentage of the flesh of the fruit extrudes through the screen as a solid chunk as indicated in this figure. The flesh of the fruit is therefore in a good condition for use in making a product where pieces of the flesh are desired, as for example, in the making of chili sauce.

It is important that the peripheries of the drums are smooth and without perforations at each end where the hoops are located, and at the middle where the center support or disk is located, as openings in these areas would form pockets into which fruit could be pressed, but could not pass through the screens, and fruit pressed into such pockets would be difficult to remove and provide cavities for decaying fruit and mold spores.

While I have shown and described one particular embodiment of my invention it will be understood that various modifications and changes may be made in the construction and arrangement of parts within the contemplation of my invention and under the scope of the following claims.

I claim:

1. Apparatus for separating the flesh from the skin of fruit comprising a cutter for severing the fruit into two pieces, a pair of opposed squeezing drums below the cutter from which the pieces fall from the cutter, said drums being of generally cylindrical form and rotatable about horizontal axes, said drums having their peripheral surfaces formed of coarse screens, means for driving the drums in opposite directions, and a knife in each drum bearing against the interior of the screen just below the point where the peripheries of the drums are closest together for severing the protruding flesh of the fruit which is forced through the mesh of the screen from the skins which are restrained on the exterior of the drums.

2. Apparatus for separating the flesh from the skin of fruit as defined in claim 1 wherein the drums have an internal support midway between the two ends with a drive shaft passing through the support, the supports within the respective drums being in the plane of the cutter, and a divider plate in the vertical plane of the cutter extending from adjacent the tops of the drums to a level adjacent the cutter whereby the pieces of severed fruit fall to opposite sides of the divider plate.

3. Apparatus for separating the flesh from the skin of fruit comprising a conveyor having a succession of carriers therealong at regular intervals, each carrier being of a size to hold a single fruit and being comprised of two confronting concaved sections separated from each other by a slit extending in the direction of travel of the conveyor, a cutter beneath which the conveyor passes for cutting the fruit into two parts as it is carried under the cutter by the conveyor, the slit between the confronting sections of each carrier providing clearance for the cutter while the fruit in the carrier is being severed, a sprocket around which the conveyor passes for discharging the pieces of fruit from the carriers after the fruit has been severed, a pair of opposed horizontal squeezing rolls below the sprocket with their peripheries in contact and positioned with respect to the sprocket so that the pieces of fruit fall from the conveyor into the bight between the two squeezing rolls, each roll having its surface formed of a screen with closely spaced large apertures to enable flesh of the fruit, still attached to the skin, to protrude therethrough while the skin is pressed against the exterior of the screen, means for driving the rolls in opposite directions with the direction of rotation being such as to carry the pieces of fruit downwardly between the rolls, and knife means in each roll close to the line of closest approach of the two confronting rolls at a point where the skin is confined between the two rolls for severing the flesh of the fruit which is forced through the screen forming the surface of the roll from the skin which is restrained on the exterior of the roll.

4. Apparatus as defined in claim 3 in which each roll has an internal support midway between its ends, a drive shaft passing through each support, the supports for the respective rolls being in the same vertical plane as the cutter, and a divider plate extending in a vertical direction between the sprocket for said conveyor and the rolls whereby the two pieces of fruit fall to opposite sides of the supports within the rolls.

5. Apparatus for separating the flesh from the skin of fruit as defined in claim 4 in which the knife means extends inwardly into each roll from each end thereof and is associated with a coextensive trough for receiving the pieces of flesh which are severed by the knife means, the ends of the troughs projecting from the ends of the rolls.

6. Apparatus for separating the flesh from the skin of fruit as defined in claim 4 in which the periphery of each roll is smooth and imperforate in the vertical plane of said divider plate.

7. Apparatus for separating the flesh from the skin of fruit, said apparatus comprising a pair of opposed squeezing drums supported for rotation about horizontal axes and having their peripheries formed of screens of sheet metal thickness, the screens having apertures sufficiently large to enable the flesh of fruit to be pushed therethrough while the screen restrains the skin from passing through the apertures, means for rotating the drums together in opposite directions, the peripheries of the two drums converging toward a bight formed between them, means for delivering fruit to the bight of the drums whereby the fruit is carried into the bight of the drums and the flesh thereof forced through the screens while the skin is squeezed against the outer surface of the screens and confined against them, and cutting means bearing against the inner face of the screens inside the drums at a point where the skins are so confined between the drums for cutting away the flesh of the fruit from the skins.

8. Apparatus for separating the flesh from the skin of fruit as defined in claim 7 wherein the drums have an open end and the cutting means comprises a knife fixedly supported outside the drum at one end thereof and projecting into the open end and having a cutting edge bearing against the interior surface of the screen.

9. Apparatus for separating the flesh from the skin of fruit as defined in claim 7 wherein the drums have an open end and the cutting means comprises a knife fixedly supported outside the drum at one end thereof and projecting into the open end and having a cutting edge bearing against the interior surface of the screen, and a trough extending into the open end of each drum and lengthwise of the knife for receiving the pulp which is cut away from the skins by the knife.

10. Apparatus for separating flesh from the skins of fruit comprising a pair of opposed hollow rolls the peripheries of which are formed of thin, coarse mesh screens through the openings of which the flesh of the fruit being squeezed between the rolls may protrude into the interior of the rolls while the skin is confined against the exterior of the rolls, means within the rolls at the areas of closest approach of the peripheries of the two rolls where the fruit is squeezed between the rolls with the skins against their surfaces for severing the flesh which protrudes through the screens from the skins, and means for driving the rolls in opposite directions to force the fruit between the rolls.

References Cited in the file of this patent

UNITED STATES PATENTS

| | | |
|---|---|---|
| 1,032,167 | Vernstein | July 9, 1912 |
| 1,194,266 | Alvord | Aug. 8, 1916 |
| 2,209,760 | Berry | July 30, 1940 |
| 2,212,066 | Fry | Aug. 20, 1940 |
| 2,362,126 | Fry | Nov. 7, 1944 |
| 2,687,085 | Koffler | Aug. 24, 1954 |

FOREIGN PATENTS

| | | |
|---|---|---|
| 31,674 | Netherlands | Dec. 15, 1933 |
| 634,191 | Germany | Aug. 20, 1936 |